(12) United States Patent
Gerweck et al.

(10) Patent No.: US 10,988,084 B2
(45) Date of Patent: Apr. 27, 2021

(54) HEIGHT ADJUSTABLE CARGO STORAGE ASSEMBLY

(71) Applicant: Ford Global Technologies, LLC, Dearborn, MI (US)

(72) Inventors: Jevon Gerweck, Monroe, MI (US); Steven Ebejer, Westland, MI (US); Jason Wiedmayer, Manchester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 56 days.

(21) Appl. No.: 16/440,065

(22) Filed: Jun. 13, 2019

(65) Prior Publication Data

US 2020/0391662 A1    Dec. 17, 2020

(51) Int. Cl.
*B60R 5/04* (2006.01)
*B62D 33/04* (2006.01)
*B62D 25/20* (2006.01)

(52) U.S. Cl.
CPC .......... *B60R 5/045* (2013.01); *B62D 25/2027* (2013.01); *B62D 33/04* (2013.01)

(58) Field of Classification Search
CPC .......... B60R 5/09; B60R 5/041; B60R 5/045; B60R 5/048; B60R 5/04
USPC ............ 296/37.14; 224/42.34, 224; 190/103, 190/104, 105
See application file for complete search history.

(56) References Cited

U.S. PATENT DOCUMENTS

| 1,756,775 | A | * | 4/1930 | Winning | E05B 65/52 |
| | | | | | 292/281 |
| 1,844,336 | A | * | 2/1932 | Ritter, Jr. | A45C 13/03 |
| | | | | | 206/289 |
| 3,233,936 | A | * | 2/1966 | Jakosky | B60R 5/042 |
| | | | | | 296/76 |
| 4,787,488 | A | * | 11/1988 | Campanini | A45C 7/0031 |
| | | | | | 190/104 |
| 5,584,097 | A | * | 12/1996 | Lu | A45C 5/14 |
| | | | | | 16/113.1 |
| 6,126,220 | A | * | 10/2000 | Brasher | B60P 1/286 |
| | | | | | 296/26.04 |
| 6,408,997 | B1 | * | 6/2002 | Chen | A45C 5/14 |
| | | | | | 190/103 |
| 6,467,830 | B1 | * | 10/2002 | Cortright | B60R 13/06 |
| | | | | | 296/26.04 |
| 7,328,779 | B2 | * | 2/2008 | King | A45C 7/0022 |
| | | | | | 190/104 |

(Continued)

FOREIGN PATENT DOCUMENTS

DE    10201803 A1    8/2003
JP    2009113634 A    5/2009

(Continued)

*Primary Examiner* — Jason S Morrow
*Assistant Examiner* — Kevin P Weldon
(74) *Attorney, Agent, or Firm* — David Coppiellie; Price Heneveld LLP (57) ABSTRACT

A cargo storage assembly for use on a floor of a vehicle may include an outer sidewall assembly defining an interior and an inner sidewall assembly disposed within the interior and slideably coupled with the outer sidewall assembly. A top panel may be coupled with the inner sidewall assembly and defining a floor surface, wherein the floor surface is operable between a raised position and a lowered position.

18 Claims, 8 Drawing Sheets

(56) References Cited

U.S. PATENT DOCUMENTS

| | | |
|---|---|---|
| 7,748,775 B2 | 7/2010 | Mercurio |
| 9,676,339 B2 | 6/2017 | Huebner et al. |
| 9,827,914 B2 | 11/2017 | Murray et al. |
| 10,583,763 B1 * | 3/2020 | Schnur ..................... B60R 5/04 |

FOREIGN PATENT DOCUMENTS

| | | |
|---|---|---|
| JP | 2009528219 A | 8/2009 |
| WO | 2008110773 A1 | 9/2008 |

* cited by examiner

HEIGHT ADJUSTABLE CARGO STORAGE ASSEMBLY

FIELD OF THE INVENTION

The present disclosure generally relates to a height adjustable cargo storage assembly for use in a vehicle. More specifically, the present disclosure relates to a height adjustable cargo storage bin operable between a raised position and a lowered position.

BACKGROUND OF THE INVENTION

Various automobiles include cargo areas for storage. An adjustable load floor may be included in the cargo area to provide alternative storage configurations. Typically, the load floor is lifted at an angle and pulled forward into a raised positon to provide two levels of storage. During positioning of the load floor into the raised position, any items disposed on the top of the load floor may slide backwards.

SUMMARY OF THE INVENTION

According to one aspect of the present disclosure, a cargo storage assembly for use on a floor of a vehicle includes an outer sidewall assembly defining an interior configured for storage and an inner sidewall assembly disposed within the interior. The inner sidewall assembly includes first and second height adjusting mechanisms configured to adjust the height of the inner sidewall assembly relative to the outer sidewall assembly between a raised position and a lowered position, first and second handles operably coupled with the first and second height adjusting mechanisms, respectively, and a bezel disposed around an upper portion of the inner sidewall assembly. The first and second handles are disposed within a recess in the bezel and the inner sidewall assembly is telescopically coupled with the first sidewall assembly between the raised position and the lowered position via the first and second handles.

According to another aspect of the present disclosure, a cargo storage assembly for a vehicle includes an outer sidewall assembly defining an interior and configured to be disposed on a floor of the vehicle and an inner sidewall assembly disposed within the interior. The inner sidewall assembly includes at least one height adjusting mechanism configured to adjust the height of the inner sidewall assembly relative to the outer sidewall assembly between a raised position and a lowered position and a top panel coupled with an upper portion of the inner sidewall assembly and defining a cover.

According to yet another aspect of the present disclosure, a cargo storage assembly for use on a floor of a vehicle includes an outer sidewall assembly defining an interior, an inner sidewall assembly disposed within the interior and slideably coupled with the outer sidewall assembly, and a top panel coupled with the inner sidewall assembly and defining a floor surface, wherein the floor surface is operable between a raised position and a lowered position.

These and other aspects, objects, and features of the present invention will be understood and appreciated by those skilled in the art upon studying the following specification, claims, and appended drawings.

2

DETAILED DESCRIPTION OF THE PREFERRED EMBODIMENTS

Figure 1A:
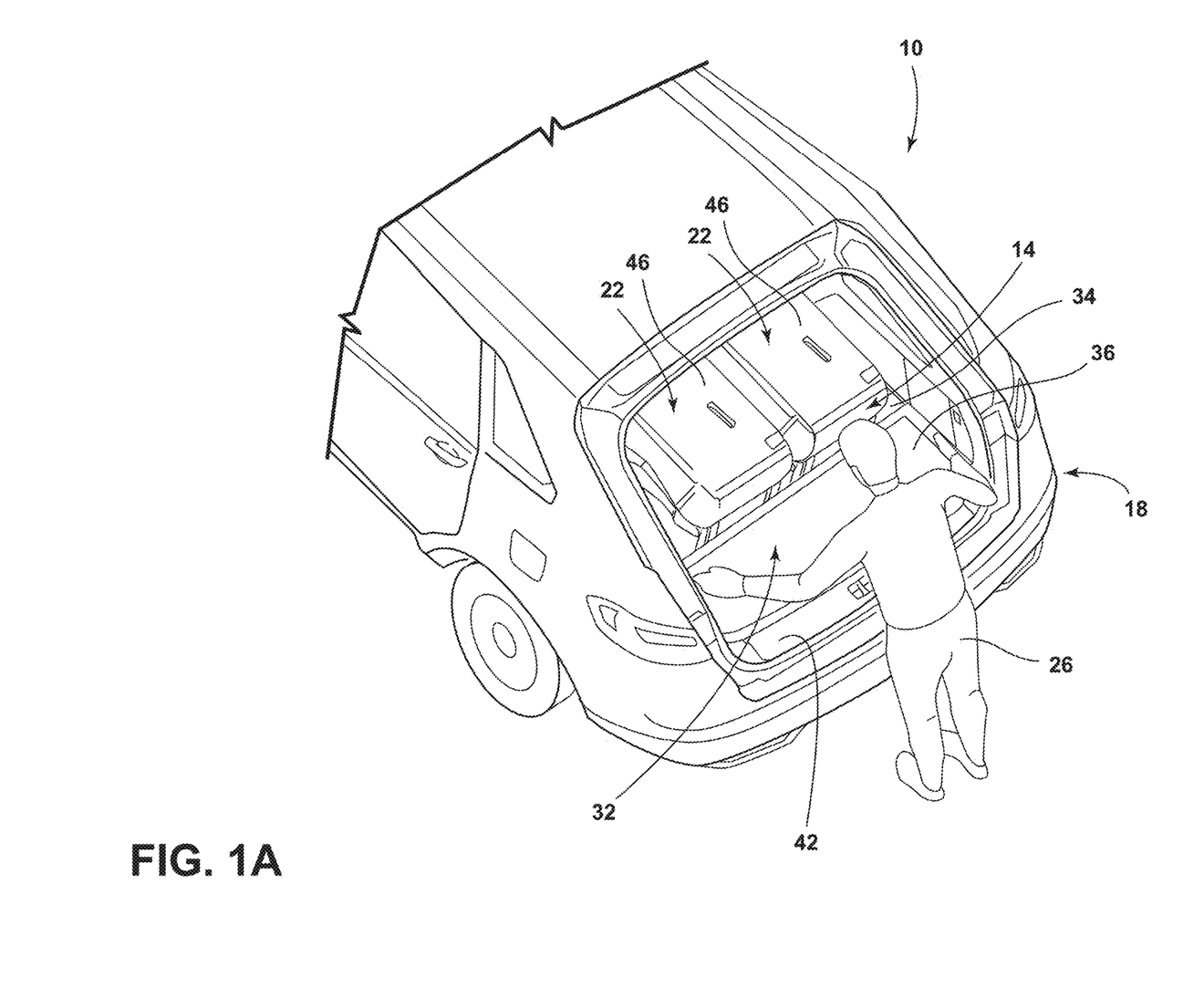
FIG. 1A is a top perspective view of a rear portion of a motor vehicle having a cargo storage assembly in a lowered position according to various aspects described herein.

For purposes of description herein, the terms "upper," "lower," "right," "left," "rear," "front," "vertical," "horizontal," and derivatives thereof shall relate to the concepts as oriented in FIG. 1A. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1B:
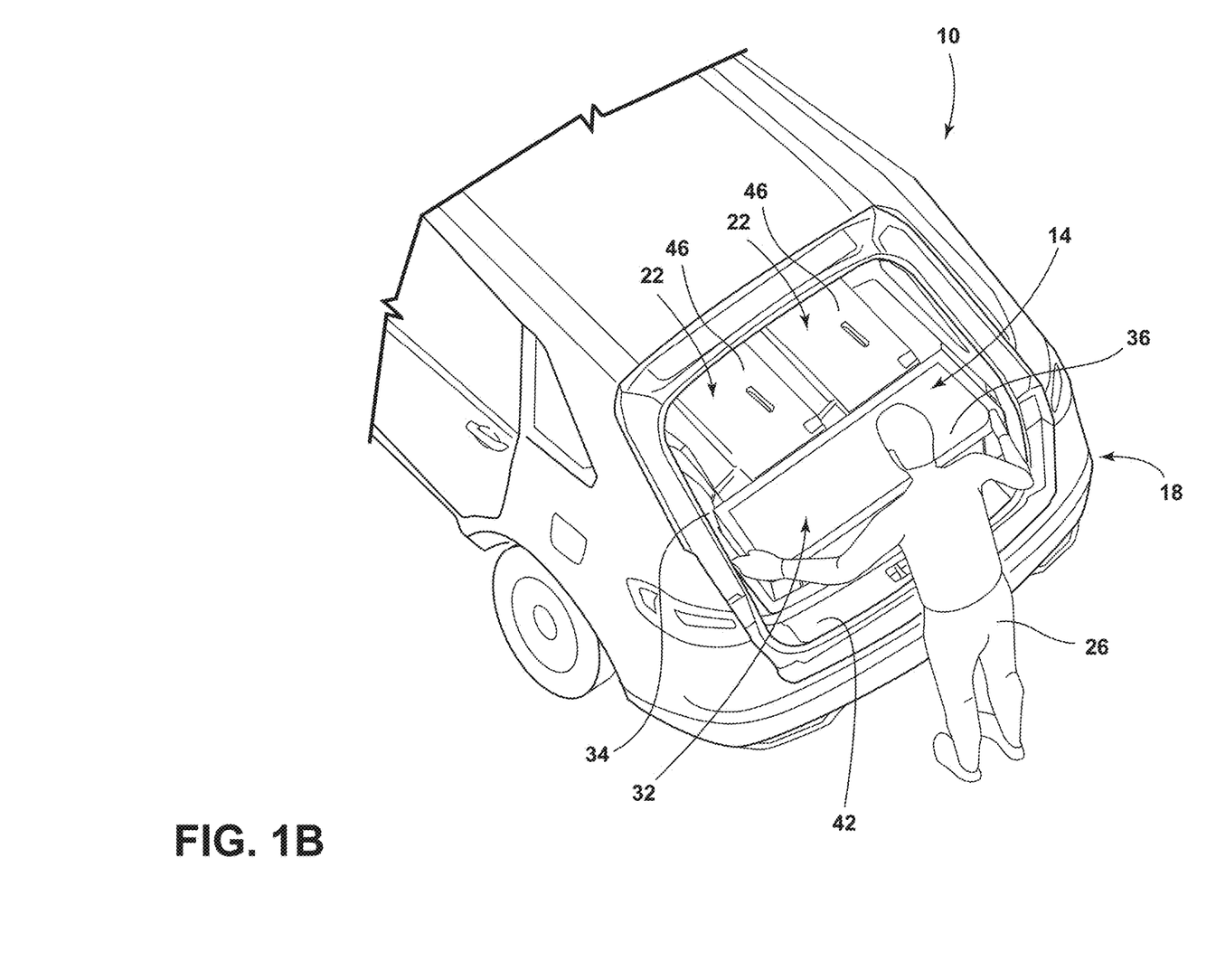
FIG. 1B is a top perspective view of the vehicle and cargo storage assembly of FIG. 1A in a raised position according to various aspects described herein.

Referring to FIG. 1A, a vehicle 10, such as a wheeled automotive vehicle, is shown without a trunk lid, or deck lid, in order to more clearly view a cargo area 14. The cargo area 14 may be located at a rear end 18 of the vehicle 10. One or more seats 22 may be positioned in the cargo area 14. The seats 22 may be foldable such that a user 26 may adjust the seats 22 into a folded position thereby creating a flat surface for cargo. A cargo storage assembly 32 may be provided in the cargo area 14 and may be configured to be disposed on a floor 34 of the vehicle 10. The cargo storage assembly 32 may include a top panel 36 defining a floor surface. The cargo storage assembly 32, including the top panel 36, may be made of any suitable material such as a composite, plastic, metal, or any combination thereof. Additionally or alternatively, the top panel 36 may include a carpet material that matches the material of a back surface 46 of the seats 22. Moreover, any component of the cargo storage assembly 32 described herein may include a material corresponding with components of the vehicle 10. FIG. 1A illustrates the cargo storage assembly 32 in a lowered position. In some examples, the top panel 36 may be generally level with a trunk latch 42 in the lowered position. FIG. 1B illustrates the cargo storage assembly 32 in a raised position. In some examples, the top panel 36 may be generally level with the back surface 46 of the seats 22 in the raised position. In this way, a flat load floor may be provided in the vehicle 10 cargo area 14.

Figure 2:
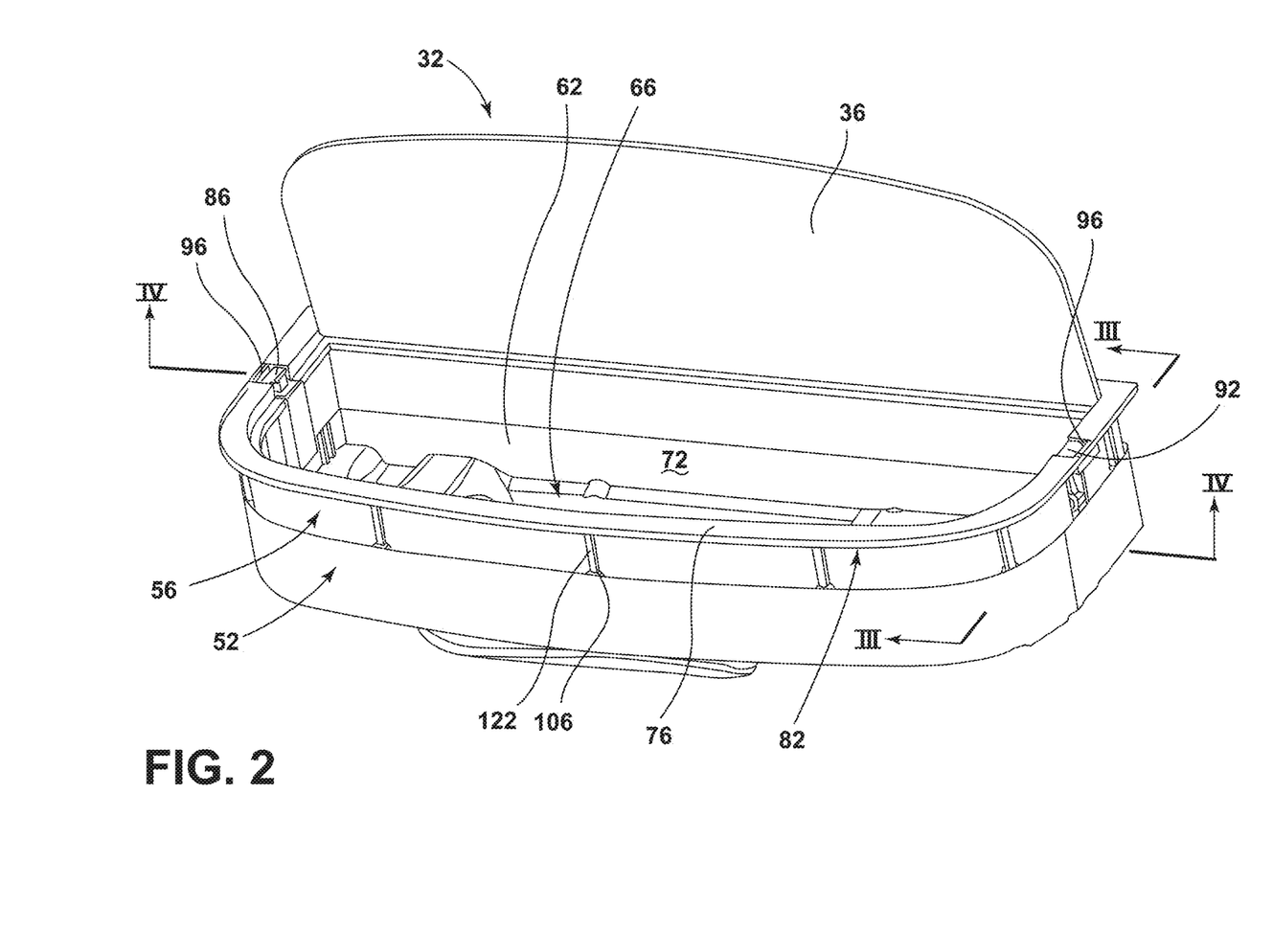
FIG. 2 is a perspective view of a cargo storage assembly in the raised positon with a cover opened according to various aspects described herein.

Referring now to FIG. 2, the cargo storage assembly 32 is illustrated in greater detail. The cargo storage assembly 32 may include an outer sidewall assembly 52 and an inner sidewall assembly 56. The outer sidewall assembly 52 may include a sidewall portion 62 and a bottom wall 66 may be coupled to the sidewall portion 62. The sidewall portion 62 may be configured as at least one wall constructed to form a perimeter defining an enclosure, or an interior 72. The interior 72 may be configured for cargo storage. The bottom wall 66 may be configured to mate with, or to be positioned on, the floor 34 of the vehicle 10 (FIG. 1A). In some examples, the outer sidewall assembly 52 does not include the bottom wall 66.

The inner sidewall assembly 56 may be positioned within the interior 72 and may be slideably coupled with the outer sidewall assembly 52 between the raised position and the lowered position. In some examples, a bezel 76 may disposed around an upper portion 82 of the inner sidewall assembly 56. A first handle 86 and a second handle 92 may be disposed within a recess 96 in the bezel 76, which may facilitate telescopic movement of the inner sidewall assembly 56 with the outer sidewall assembly 52. However, it is within the scope of various aspects described herein to include only one handle, or more than two handles. The top panel 36 may define a cover and may be pivotably coupled with the upper portion 82 of the inner sidewall assembly 56 between opened and closed positions. Pivotably coupled may include any suitable hinge mechanism configured to connect the top panel 36 with the upper portion 82 while allowing an angle of rotation. FIG. 2 illustrates the top panel 36 in an opened position. In the closed position, which is illustrated in FIGS. 1A and 1B, the cargo storage assembly 32 may provide an enclosed storage space. In this way, the cargo storage assembly 32 may further include a locking mechanism to selectively secure the top panel 36 with the upper portion 82.

Figure 3:
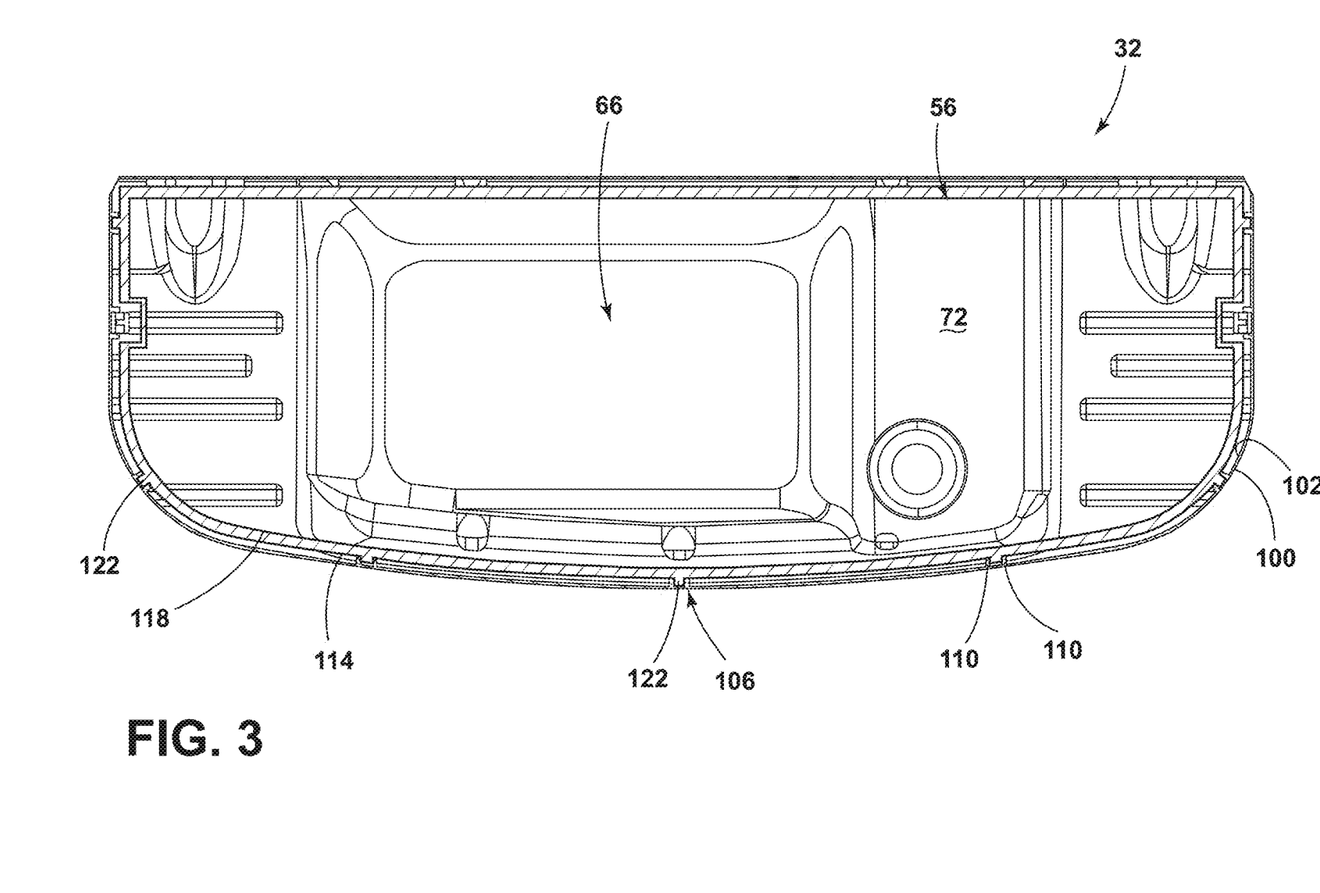
FIG. 3 is a top, cross-sectional view of the cargo storage assembly of FIG. 2 below cutting plane III-III according to various aspects described herein.

FIG. 3 illustrates a cross-sectional view of the cargo storage assembly 32 along line III-III of FIG. 2. The outer sidewall assembly 52 may include an outer surface 100 and an inner surface 102. The inner surface 102 of the outer sidewall assembly 52 may include a plurality of slots, or channels 106. In some examples, the channels 106 may be defined by a pair of vertically extending ribs 110. The inner sidewall assembly 56 may include an outer surface 114 and an inner surface 118. The outer surface 114 of the inner sidewall assembly 56 may include a plurality of struts 122. The struts 122 may be slideably received within a corresponding channel 106. In some examples, the struts 122 may be configured as vertically extending guides, projections, rods, or bars, and the like, disposed on the outer surface 114 and configured to interface with the channels 106. In this way, the struts 122 may be configured to provide stability for the inner sidewall assembly 56 during movement, which may include the telescopic movement of the inner sidewall assembly 56 with the outer sidewall assembly 52, in order to prevent twisting.

Figure 4A:
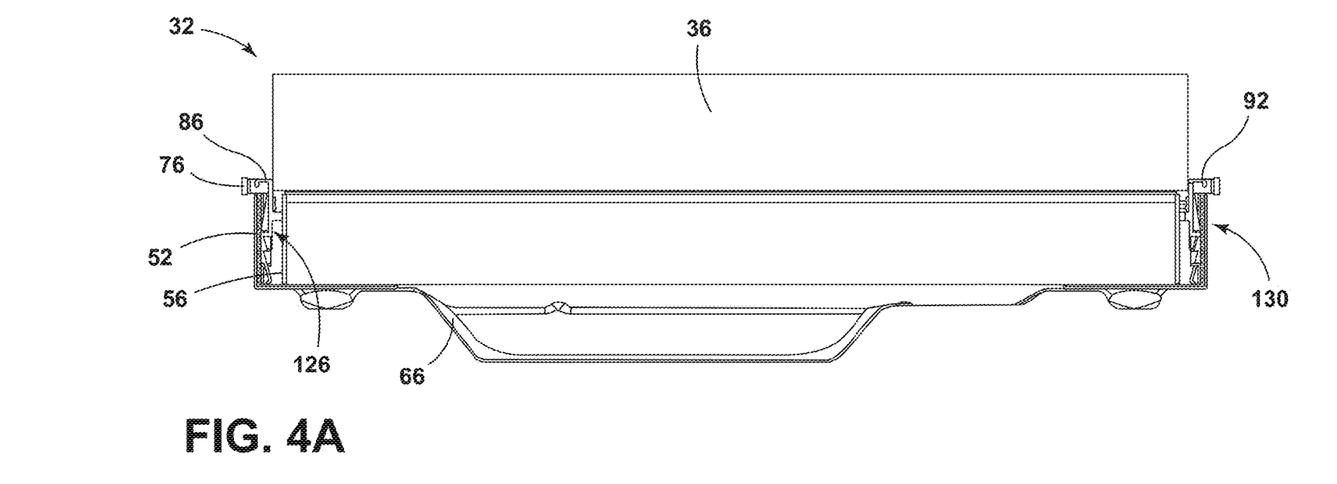
FIG. 4A is a cross-sectional view of the cargo storage assembly of FIG. 2 along line IV-IV in the lowered position according to various aspects described herein

Referring now to FIG. 4A, a cross-sectional view of the cargo storage assembly 32 along line IV-IV of FIG. 2 is illustrated in the lowered position with the top panel 36 in the opened position according to various aspects described herein. The cargo storage assembly 32 may further include at least one height adjusting mechanism 126 configured to adjust the height of the inner sidewall assembly 56 relative to the outer sidewall assembly 52 between the raised position and the lowered position. In some examples, the cargo storage assembly 32 may include a first height adjusting mechanism 126 and a second height adjusting mechanism 130. The first handle 86 and the second handle 92 may be operably coupled with the first height adjusting mechanism 126 and the second height adjusting mechanism 130, respectively. The first height adjusting mechanism 126 and the second height adjusting mechanism 130 may be coupled with the inner sidewall assembly 56 on opposing sides of the inner sidewall assembly 56. In this way, the user 26 may be able to reach for the first handle 86 and the second handle 92 by spanning their arms as illustrated in FIGS. 1A and 1B. In some examples, the first height adjusting mechanism 126 and the second height adjusting mechanism 130 may be spaced approximately 1100 mm (3.61 ft.) Additionally, it is within the scope of aspects described herein for the cargo storage assembly 32 to include only a-one, or more than two height adjusting mechanisms 126, 130 and/or handles 86, 92.

Figure 4B:
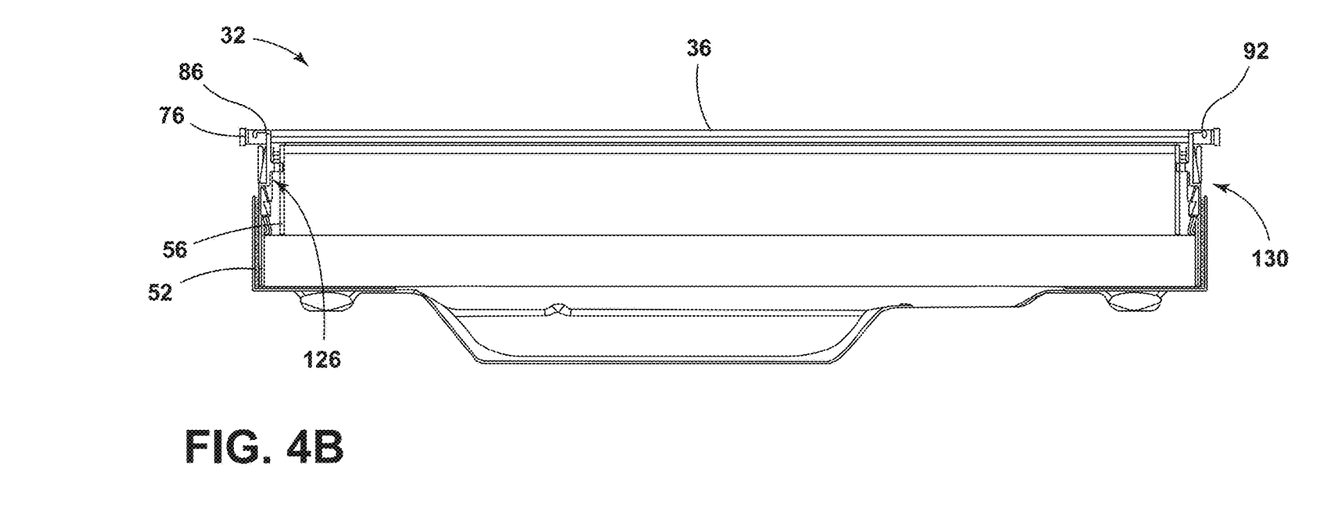
FIG. 4B is a cross-sectional view of the cargo storage assembly of FIG. 2 along line IV-IV with the cover closed according to various aspects described herein.

FIG. 4B illustrates a cross-sectional view of the cargo storage assembly 32 along line IV-IV of FIG. 2 is illustrated in the raised position with the top panel 36 in the closed position according to various aspects described herein. The height adjusting mechanisms 126, 130 may be any suitable mechanism configured to adjust the height of the inner sidewall assembly 56 relative to the outer sidewall assembly 52 between the raised position and the lowered position, which may include any vertical adjustment mechanism including but not limited to: a spindle lifting column, a hydraulic lifting column, a spring pin adjustment, a manual or electrical lifting devices, etc. Therefore, according to various aspects of the present disclosure, a handle may not be operably coupled to the at least one height adjusting mechanism 126. Furthermore, the raised position may include any position where the inner sidewall assembly 56 is raised relative to the outer sidewall assembly 52, which may include a range of positions.

Figure 5A:
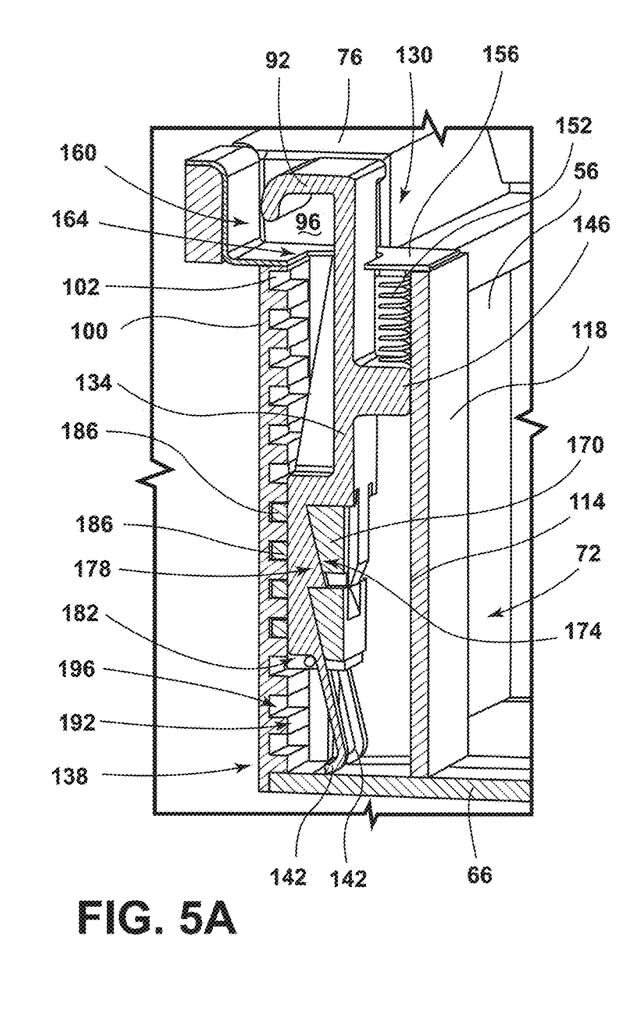
FIG. 5A is an enlarged perspective cross-sectional view the height adjustment assembly of FIG. 4A according to various aspects described herein.

Referring now to FIG. 5A, an enlarged perspective view of the height adjustment assembly 130 is illustrated. In some examples, a portion of the inner sidewall assembly 56 may extend toward the interior 72 adjacent the height adjustment assembly 130 in order to provide a space for the height adjustment assembly 130 to interface with the outer sidewall assembly 52 while separating the height adjustment assembly 130 from the interior 72. The height adjustment assembly 130 may include the handle 92 extending from a longitudinal body 134.

The longitudinal body 134 may extend from the upper portion 82 of the inner sidewall assembly 56 toward a lower portion 138 of the outer sidewall assembly 52, which may include the bottom wall 66, and may terminate in a pair of spaced, angled bars 142. The longitudinal body 134 may further include a protrusion 146 defining a ledge. A spring 152 may be retained between the protrusion 146 and a stop 156 provided on the upper portion 82 of the inner sidewall assembly 56. In some examples, the stop 156 may be in the form of a bracket 160 disposed within the recess 96 of the bezel 76. The longitudinal body 134 may extend through a slot, or an aperture 164 in the bracket 160.

The height adjusting mechanism 130 may further include a block body 170 coupled with the longitudinal body 134. In some examples, the block body 170 includes at least one angled surface 174 configured to mate with and slide relative to at least one angled surface 178 on the longitudinal body 134. The block body 170 may have a width less than the spacing between the bars 142 such that the block body 170 fits within the longitudinal body 134. Additionally or alternatively, the block body 170 may include a recess 182 on either side of the block body 170 configured to receive the bars 142 and guide the block body 170 during sliding movement. The block body 170 may include a plurality of vertically aligned teeth 186, which may be configured as projections extending toward the inner surface 102 of the outer sidewall assembly 52. Additionally, the inner surface 102 of the outer sidewall assembly 52 may include a plurality of vertically aligned teeth 192 configured to mate, or interlock, with the teeth 186 on the block body 170. As such, the teeth 192 on the inner surface 102 may define ledges, or grooves 196 that may receive the teeth 186 on the block body 170 to secure the inner sidewall assembly 56 in the raised position and the lowered position.

Figure 5B:
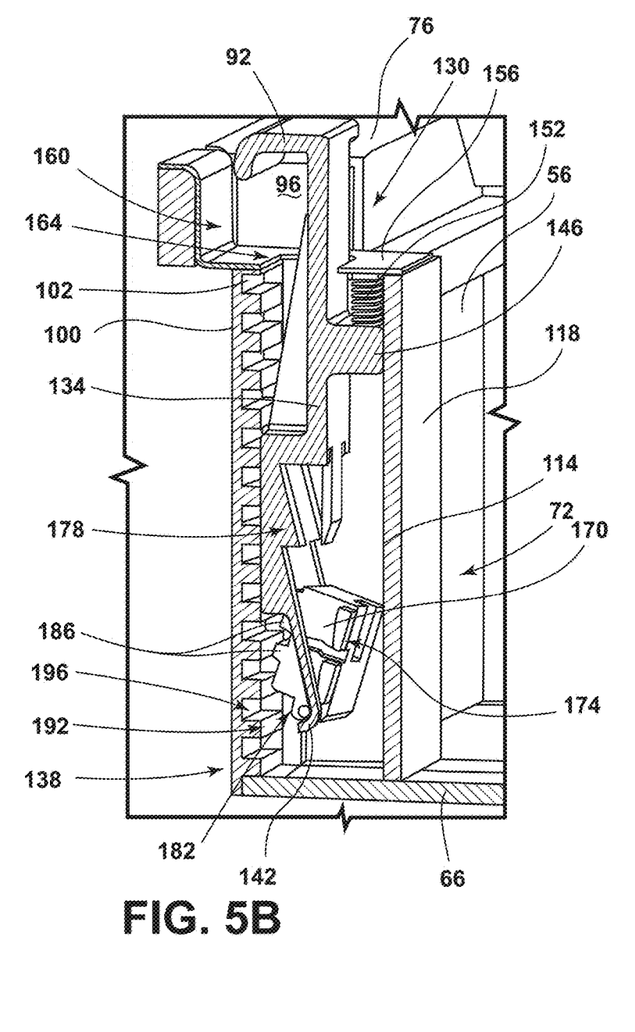
FIG. 5B is an enlarged perspective cross-sectional view of the height adjustment assembly of FIG. 4B according to various aspects described herein.
Figure 5C:
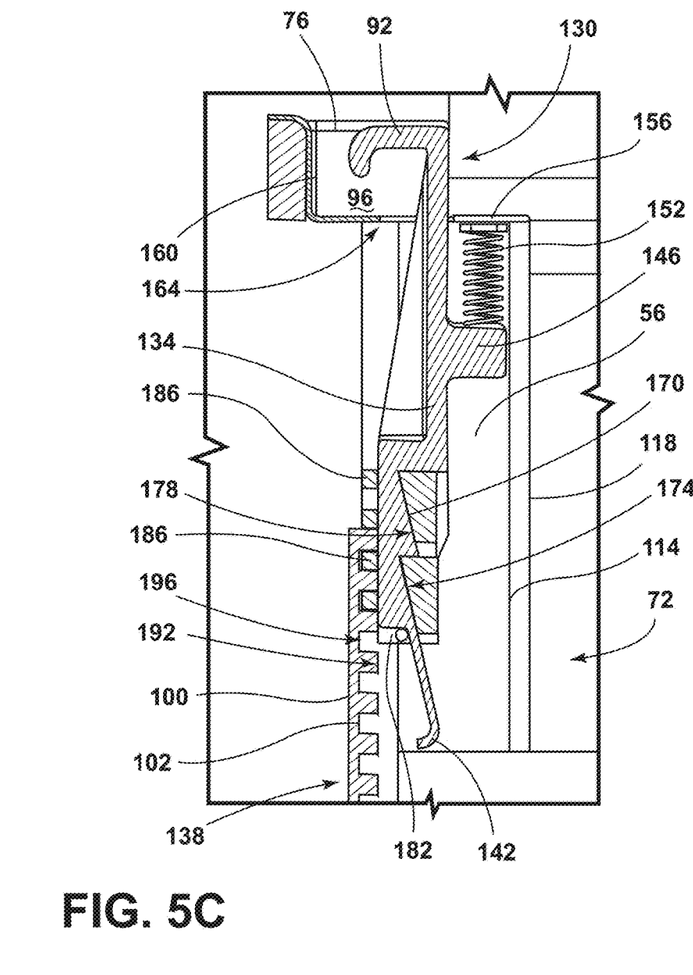
FIG. 5C is an enlarged cross-sectional view of the height adjustment assembly of FIG. 4B according to various aspects described herein.

In order to raise the inner sidewall assembly 56 relative to the outer sidewall assembly 52, as illustrated in FIG. 5B, the user 26 may lift the handle 92 to release the latching mechanism and continue lifting to the desired height. Lifting of the handle 92 may compress the spring 152, thereby enabling the block body 170 to be released from the longitudinal body 134 and slide downwards on the at least one angled surface 178 on the longitudinal body 134. In this way, the teeth 186 on the block body 170 may disengage from teeth 192 on the inner surface 102 of the outer sidewall assembly 52. As such, the block body 170 and the inner sidewall assembly 56 may become slideable relative to the outer sidewall assembly 52. Releasing the handle 92 may allow the spring 152 to expand, as illustrated in FIG. 5C. In this way, the at least one angled surface 174 on the block body 170 and the at least one angled surface 178 on the longitudinal body 134 may slide towards each other and the grooves 196 on the inner surface 102 may receive the teeth 186 on the block body 170 to secure the inner sidewall assembly 56 in the raised position.

Referring back to FIG. 5A, in order to lower the inner sidewall assembly 56 relative to the outer sidewall assembly 52, the user 26 may lift the handle 92 to release the latching mechanism, followed by pushing down on the handle 92 to reposition the inner sidewall assembly 56. As previously discussed, releasing the handle 92 may allow the spring 152 to expand. In this way, the at least one angled surface 174 on the block body 170 and the least one angled surface 178 on the longitudinal body 134 may slide towards each other and the grooves 196 on the inner surface 102 may receive the teeth 186 on the block body 170 to secure the inner sidewall assembly 56 in the lowered position.

Figures 6A, 6B, 6C:
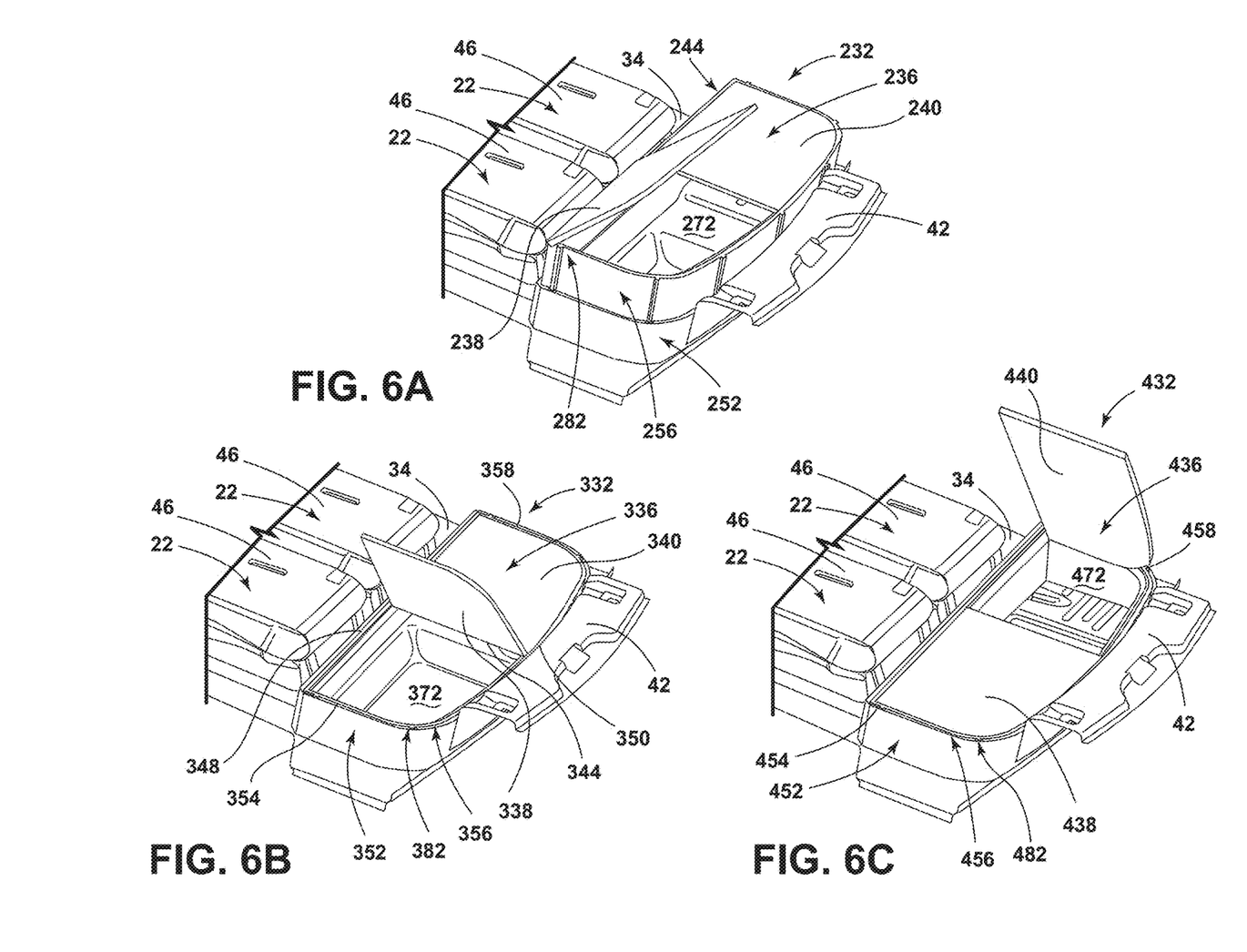
FIG. 6A is a perspective view of a cargo storage assembly in the raised position according to various aspects described herein.
FIG. 6B is a perspective view of a cargo storage assembly in the lowered position according to various aspects described herein.
FIG. 6C is a perspective view of a cargo storage assembly in the lowered position according to various aspects described herein.

FIG. 6A is a perspective view of a cargo storage assembly 232 in the raised position according to various aspects described herein. The cargo storage assembly 232 is similar to the cargo storage assembly 32, therefore like parts will be identified with like numerals increasing by 200, unless otherwise noted. One difference of the cargo storage assembly 232 is the configuration of the top panel 236. The top panel 236 may include a first panel 238 and a second panel 240 pivotably coupled with the upper portion 282 of the inner sidewall assembly 256 between opened and closed positions. The first panel 238 and a second panel 240 may be coupled with the upper portion 282 along an edge 244 of the upper portion 282. In some examples, the edge 244 is a rear edge adjacent the seats 22. In this way, by lifting one of the first panel 238 and the second panel 240 adjacent a front edge adjacent the trunk latch 42, the user may access a portion of the interior 272. Alternatively, by lifting both of the first panel 238 and the second panel 240 the user may access the entire interior 272.

FIG. 6B is a perspective view of a cargo storage assembly 332 in the lowered position according to various aspects described herein. The cargo storage assembly 332 is similar to the cargo storage assembly 32, therefore like parts will be identified with like numerals increasing by 300, unless otherwise noted. One difference of the cargo storage assembly 332 is the configuration of the top panel 336. The top panel 336 may include a first panel 338 and a second panel 340 pivotably coupled with the upper portion 382 of the inner sidewall assembly 356 between opened and closed positions. The first panel 338 and a second panel 340 may be coupled with the upper portion 382 along a transverse edge 344 of the upper portion 382. The transverse edge 344 may extend from a rear edge 348 adjacent the seats 22 to a front edge 350 adjacent the trunk latch 42. In some examples, the transverse edge 344 is positioned in the center. In this way, by lifting one of the first panel 338 and the second panel 340 adjacent a side edge 354, 358, respectively, the user may access a portion of the interior 372. Alternatively, by lifting both of the first panel 338 and the second panel 340 the user may access the entire interior 372.

FIG. 6C is a perspective view of a cargo storage assembly 432 in the lowered position according to various aspects described herein. The cargo storage assembly 432 is similar to the cargo storage assembly 32, therefore like parts will be identified with like numerals increasing by 400, unless otherwise noted. One difference of the cargo storage assembly 432 is the configuration of the top panel 436. The top panel 436 may include a first panel 438 and a second panel 440 pivotably coupled with the upper portion 482 of the inner sidewall assembly 456 between opened and closed positions. The first panel 438 and a second panel 440 may be coupled with the upper portion 482 along opposing side edges 454, 458 of the upper portion 482. In this way, by lifting one of the first panel 438 and the second panel 440 from a free edge opposite from side edges 454, 458, the user may access a portion of the interior 472. Alternatively, by lifting both of the first panel 438 and the second panel 440 the user may access the entire interior 472.

According to one aspect of the present disclosure, a cargo storage assembly for use on a floor of a vehicle may include an outer sidewall assembly defining an interior configured for storage and an inner sidewall assembly disposed within the interior. The inner sidewall assembly may include first and second height adjusting mechanisms configured to adjust the height of the inner sidewall assembly relative to the outer sidewall assembly between a raised position and a lowered position, first and second handles operably coupled with the first and second height adjusting mechanisms, respectively, and a bezel disposed around an upper portion of the inner sidewall assembly. The first and second handles may be disposed within a recess in the bezel and the inner sidewall assembly may be telescopically coupled with the first sidewall assembly between the raised position and the lowered position via the first and second handles Embodiments of the first aspect of the disclosure can include any one or a combination of the following features:
- a plurality of channels disposed about an inner surface of the outer sidewall assembly and a plurality of struts disposed about an outer surface of the inner sidewall assembly. Each strut may be slideably received within a corresponding channel;
- a top panel defining a cover and pivotably coupled with the upper portion of the inner sidewall assembly;
- a sidewall portion and a bottom wall coupled with the sidewall portion and disposed on the floor of the vehicle;
- a plurality of grooves disposed vertically along an inner surface of the outer sidewall assembly and a plurality of mating projections disposed vertically along an outer surface of the inner sidewall assembly, wherein the mating projections are received within the grooves to secure the inner sidewall assembly in the raised position and the lowered position; and
- wherein upon lifting at least one of the first and second handles, a spring provided in the inner sidewall assembly is compressed and the mating projections are released from the grooves.

According to another aspect of the present disclosure, a cargo storage assembly for a vehicle may include an outer sidewall assembly defining an interior and configured to be disposed on a floor of the vehicle and an inner sidewall assembly disposed within the interior. The inner sidewall assembly may include at least one height adjusting mechanism configured to adjust the height of the inner sidewall assembly relative to the outer sidewall assembly between a raised position and a lowered position and a top panel coupled with an upper portion of the inner sidewall assembly and defining a cover.

Embodiments of the second aspect of the disclosure can include any one or a combination of the following features:
- at least one handle operably coupled with the at least one height adjusting mechanism configured to adjust the floor surface between the raised position and the lowered position;
- a bezel disposed around an upper portion of the inner sidewall assembly, wherein the at least one handle is provided on the bezel;
- a sidewall portion and a bottom wall coupled with the sidewall portion and disposed on the floor of the vehicle;
- a plurality of grooves disposed vertically along an inner surface of the outer sidewall assembly and a plurality of mating projections disposed vertically along an outer surface of the inner sidewall assembly, wherein the mating projections are received within the grooves to secure the inner sidewall assembly in the raised position and the lowered position; and
- upon raising the inner sidewall assembly, a spring provided in the inner sidewall assembly is compressed and the mating projections are released from the grooves.

According to yet another aspect of the present disclosure, a cargo storage assembly for use on a floor of a vehicle may include an outer sidewall assembly defining an interior, an inner sidewall assembly disposed within the interior and slideably coupled with the outer sidewall assembly, and a top panel coupled with the inner sidewall assembly and defining a floor surface, wherein the floor surface may be operable between a raised position and a lowered position.

Embodiments of the third aspect of the disclosure can include any one or a combination of the following features:
- a height adjusting mechanism configured to adjust the height of the inner sidewall assembly relative to the outer sidewall assembly between a raised position and a lowered position;
- a handle operably coupled with the height adjusting mechanism configured to adjust the floor surface between the raised position and the lowered position;
- a sidewall portion and a bottom wall coupled with the sidewall portion and disposed on the floor of the vehicle;
- a plurality of grooves disposed vertically along an inner surface of the outer sidewall assembly and a plurality of mating projections disposed vertically along an outer surface of the inner sidewall assembly, wherein the mating projections are received within the grooves to secure the inner sidewall assembly in the raised position and the lowered position;
- upon raising the inner sidewall assembly, a spring provided in the inner sidewall assembly is compressed and the mating projections are released from the grooves;
- a first panel and a second panel pivotably coupled to an upper portion of the inner sidewall assembly along an edge; and
- a first panel and a second panel pivotably coupled to an upper portion of the inner sidewall assembly along opposing edges.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A cargo storage assembly for use on a floor of a vehicle, comprising:
   an outer sidewall assembly defining an interior configured for storage;
   an inner sidewall assembly disposed within the interior, comprising:
      first and second height adjusting mechanisms configured to adjust the height of the inner sidewall assembly relative to the outer sidewall assembly between a raised position and a lowered position;
      first and second handles operably coupled with the first and second height adjusting mechanisms, respectively; and
      a bezel disposed around an upper portion of the inner sidewall assembly, wherein the first and second handles are each disposed within a recess in the bezel and the inner sidewall assembly is telescopically coupled with the outer sidewall assembly between the raised position and the lowered position via the first and second handles.

2. The cargo storage assembly of claim 1, further comprising:
   a plurality of channels disposed about an inner surface of the outer sidewall assembly; and
   a plurality of struts disposed about an outer surface of the inner sidewall assembly, each strut slideably received within a corresponding channel.

3. The cargo storage assembly of claim 1, further comprising:
   a top panel defining a cover and pivotably coupled with the upper portion of the inner sidewall assembly.

4. The cargo storage assembly of claim 1, wherein the outer sidewall assembly further comprises:
   a sidewall portion; and
   a bottom wall coupled with the sidewall portion and disposed on the floor of the vehicle.

5. The cargo storage assembly of claim 1, further comprising:
   a plurality of grooves disposed vertically along an inner surface of the outer sidewall assembly; and
   a plurality of mating projections disposed vertically along an outer surface of the inner sidewall assembly, wherein the mating projections are received within the grooves to secure the inner sidewall assembly in the raised position and the lowered position.

6. The cargo storage assembly of claim 5, wherein upon lifting at least one of the first and second handles, a spring provided in the inner sidewall assembly is compressed and the mating projections are released from the grooves.

7. A cargo storage assembly for a vehicle, comprising:
   an outer sidewall assembly defining an interior and configured to be disposed on a floor of the vehicle;
   an inner sidewall assembly disposed within the interior and comprising at least one height adjusting mechanism configured to adjust the height of the inner sidewall assembly relative to the outer sidewall assembly between a raised position and a lowered position;
   a top panel coupled with an upper portion of the inner sidewall assembly and defining a cover;
   at least one handle operably coupled with the at least one height adjusting mechanism configured to adjust the cover between the raised position and the lowered position; and
   a bezel disposed around an upper portion of the inner sidewall assembly, wherein the at least one handle is provided within the bezel.

8. The cargo storage assembly of claim 7, wherein the outer sidewall assembly further comprises:
   a sidewall portion; and
   a bottom wall coupled with the sidewall portion and disposed on the floor of the vehicle.

9. The cargo storage assembly of claim 7, further comprising:
   a plurality of grooves disposed vertically along an inner surface of the outer sidewall assembly; and
   a plurality of mating projections disposed vertically along an outer surface of the inner sidewall assembly, wherein the mating projections are received within the grooves to secure the inner sidewall assembly in the raised position and the lowered position.

10. The cargo storage assembly of claim 9, wherein upon raising the inner sidewall assembly, a spring provided in the inner sidewall assembly is compressed and the mating projections are released from the grooves.

11. A cargo storage assembly for use on a floor of a vehicle, comprising:
    an outer sidewall assembly defining an interior;
    an inner sidewall assembly disposed within the interior and slideably coupled with the outer sidewall assembly;
    a top panel coupled with the inner sidewall assembly and defining a floor surface;
    a bezel disposed around an upper portion of the inner sidewall assembly; and
    at least one handle operably coupled with a height adjusting mechanism configured to slideably adjust the top panel, the at least one handle provided within the bezel, wherein the floor surface is adjustable between a raised position and a lowered position.

12. The cargo storage assembly of claim 11, wherein the height adjusting mechanism is configured to adjust the height of the inner sidewall assembly relative to the outer sidewall assembly between a raised position and a lowered position.

13. The cargo storage assembly of claim 12, wherein the handle operably coupled with the height adjusting mechanism is configured to adjust the floor surface between the raised position and the lowered position.

14. The cargo storage assembly of claim 11, wherein the outer sidewall assembly further comprises:
    a sidewall portion; and
    a bottom wall coupled with the sidewall portion and disposed on the floor of the vehicle.

15. The cargo storage assembly of claim 11, further comprising:
    a plurality of grooves disposed vertically along an inner surface of the outer sidewall assembly; and
    a plurality of mating projections disposed vertically along an outer surface of the inner sidewall assembly, wherein the mating projections are received within the grooves to secure the inner sidewall assembly in the raised position and the lowered position.

16. The cargo storage assembly of claim 15, wherein upon raising the inner sidewall assembly, a spring provided in the inner sidewall assembly is compressed and the mating projections are released from the grooves.

17. The cargo storage assembly of claim 11, wherein the top panel further includes:
    a first panel and a second panel pivotably coupled to an upper portion of the inner sidewall assembly along an edge.

18. The cargo storage assembly of claim 11, wherein the top panel further includes:
    a first panel and a second panel pivotably coupled to an upper portion of the inner sidewall assembly along opposing edges.

* * * * *